(No Model.)

J. B. B. EVANS.
BAND CUTTER AND FEEDER FOR THRASHING MACHINES.

No. 266,796. Patented Oct. 31, 1882.

WITNESSES:
Thos. Houghton.
W. Read

INVENTOR:
J. B. B. Evans
BY
ATTORNEYS.

UNITED STATES PATENT OFFICE.

JAMES B. B. EVANS, OF JUNCTION CITY, MISSOURI.

BAND-CUTTER AND FEEDER FOR THRASHING-MACHINES.

SPECIFICATION forming part of Letters Patent No. 266,796, dated October 31, 1882.

Application filed May 6, 1882. (No model.)

*To all whom it may concern:*

Be it known that I, JAMES B. B. EVANS, of Junction City, in the county of Greene and State of Missouri, have invented a new and Improved Band-Cutter and Feeder for Thrashing-Machines; and I do hereby declare that the following is a full, clear, and exact description of the same, reference being had to the accompanying drawings, forming part of this specification, in which—

Figure 1:
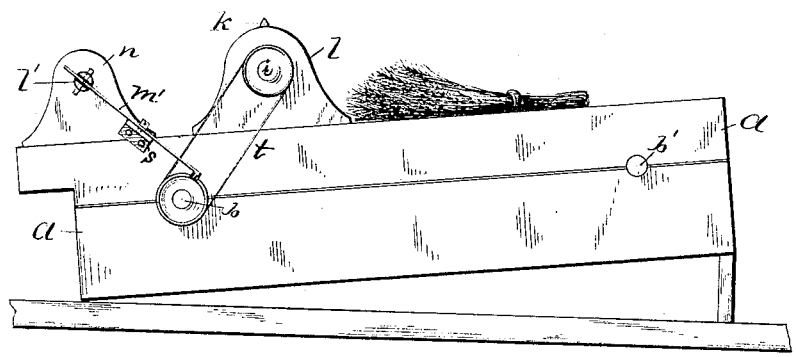
Figure 2:
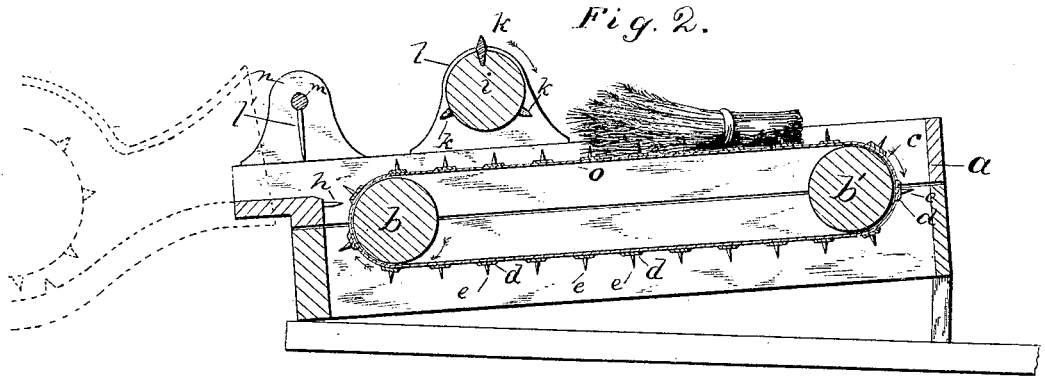
Figure 3:
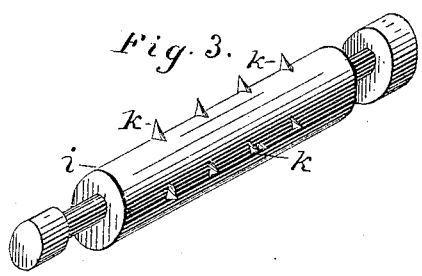

Figure 1 is a side elevation of my improved attachment for thrashing-machines. Fig. 2 is a central longitudinal section of the same, and Fig. 3 is a detail view.

The object of my invention is to feed to the cylinder of a thrashing-machine the sheaves of grain to be thrashed, and at the same time to cut the bands of the sheaves and spread them out evenly and regularly before they are introduced into the thrasher, as hereinafter more fully set forth, and pointed out in the claim.

In the accompanying drawings, $a$ represents a rectangular frame or box, in the longitudinal sides of which are journaled the transverse rolls $b\,b$, carrying the sheaf-carrier $c$. The sheaf-carrier $c$ is composed of an endless belt, $o$, passing around the transverse rolls $b\,b'$, and provided at regular intervals with transverse slats $d$, secured to the outer face of the apron, and provided with pins $e$, adapted to engage with the sheaves of grain and insure their forward movement with the sheaf-carrier when the rolls $b$ are operated by any suitable mechanism. The sheaves of grain are placed longitudinally on the sheaf-carrier $c$, so that the heads of grain will lie toward the teeth of the thrashing-cylinder and the sheaves be at right angles with the axis of the thrashing-cylinder.

$h\,h$ represent a horizontal row of small teeth, secured to the rear lower end of the opening in the frame $a$ to prevent the sheaves from being carried around with the endless apron and to guide the sheaves upward into the thrashing-cylinder.

$i$ represents a roll armed with short knives $k$, the knives of one row breaking joints with the knives of the adjacent row. The roll $i$ is journaled in the bearings $l$ in the frame $a$, and lies immediately over the sheaf-carrier $c$ and transverse thereto. Suitable power is applied to the roll $i$, whereby the bands of the sheaves will be cut as they are conveyed forward and under the roll by the sheaf-carrier $c$. The roll $i$ is made to revolve with the same speed or faster than the thrashing-cylinder, and as the top of the belt of the sheaf-carrier moves forward the top of the band-cutting roll $i$ moves backward, so that the movement of both will aid in the forward movement of the sheaves when the bands are being cut. The knives $k$ in their revolution will pass between the straws of the sheaf and catch the band and cut it, and, as before mentioned, the knives $k$ will assist in feeding forward the sheaves to the thrashing-machine.

$l'$ represents a shaker composed of a horizontal rod, $m$, hung in opposite bearings $n\,n$, secured to the upper edge of the frame $a$ at its forward end, near the thrashing-cylinder. From the rod $m$ depends a series of parallel teeth adapted to project into the sheaves as they are fed forward by the sheaf-carrier and band-cutter roll. A horizontally-reciprocating motion is imparted to the rod $m$ by means of a lever, $m'$, pivoted in a bracket, $s$, secured to the frame, and provided with a projection at its lower end, which works in a cam-groove on the outer end of the roll $b$. The upper end of the lever $m'$ is pivoted in a slot in the outer end of the horizontal rod $m$. $t$ is an endless belt connecting rolls $i$ and $b$, by means of which motion is imparted to the latter, whereby the straw of the sheaves is spread out evenly and regularly before it is fed forward into the thrashing-machine.

What I claim as my invention, and desire to secure by Letters Patent, is—

The combination, with the frame $a$, provided with the transverse rolls $b\,b'$ and teeth $h$, and slotted sheaf carrier $c$, provided with pins $e$, of the band-cutting and sheaf-feeding roll $i$, armed with knives $k$, arranged on its periphery, as set forth, and transversely-reciprocating shaker $l'$, substantially as described, and for the purpose set forth.

JAMES B. B. EVANS.

Witnesses:
JAMES EVANS,
JOHN G. PERREYMAN.